United States Patent
Winograd

(10) Patent No.: US 9,009,482 B2
(45) Date of Patent: *Apr. 14, 2015

(54) FORENSIC MARKING USING A COMMON CUSTOMIZATION FUNCTION

(71) Applicant: Verance Corporation, San Diego, CA (US)

(72) Inventor: Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/038,621

(22) Filed: Sep. 26, 2013

(65) Prior Publication Data

US 2014/0029786 A1 Jan. 30, 2014

Related U.S. Application Data

(63) Continuation of application No. 13/220,526, filed on Aug. 29, 2011, now Pat. No. 8,549,307, which is a continuation of application No. 11/479,958, filed on Jun. 30, 2006, now Pat. No. 8,020,004.

(60) Provisional application No. 60/696,146, filed on Jul. 1, 2005.

(51) Int. Cl.
*H04L 29/06* (2006.01)
*G06T 1/00* (2006.01)

(52) U.S. Cl.
CPC .............. *G06T 1/0021* (2013.01); *G06T 1/005* (2013.01); *G06T 2201/0063* (2013.01)

(58) Field of Classification Search
CPC ............ G06F 21/16; G06F 2221/0733; H04L 2209/60; G06T 1/00; H04N 21/83; H04N 2005/913; H04N 2201/3233; H04N 1/323
USPC .......................... 726/176–181; 713/176–181; 380/200–226, 236–242; 382/100, 382/181–231
See application file for complete search history.

(56) References Cited

U.S. PATENT DOCUMENTS

| 3,406,344 A | 10/1968 | Hopper |
| 3,842,196 A | 10/1974 | Loughlin |

(Continued)

FOREIGN PATENT DOCUMENTS

| CA | 2276638 | 1/2000 |
| EP | 282734 | 9/1988 |

(Continued)

OTHER PUBLICATIONS

International Search Report and Written Opinion dated Feb. 28, 2013 for International Application No. PCT/US2012/066138, filed Nov. 20, 2012 (11 pages).

(Continued)

*Primary Examiner* — Madhuri Herzog
(74) *Attorney, Agent, or Firm* — Perkins Coie LLP; Donald L. Wenskay

(57) ABSTRACT

Methods, systems, and apparatus are disclosed which enable flexible insertion of forensic watermarks into a digital content signal using a common customization function. The common customization function flexibly employs a range of different marking techniques that are applicable to a wide range of forensic marking schemes. These customization functions are also applicable to pre-processing and post-processing operations that may be necessary for enhancing the security and transparency of the embedded marks, as well as improving the computational efficiency of the marking process. The common customization function supports a well-defined set of operations specific to the task of forensic mark customization that can be carried out with a modest and preferably bounded effort on a wide range of devices. This is accomplished through the use of a generic transformation technique for use as a "customization" step for producing versions of content forensically marked with any of a multiplicity of mark messages.

20 Claims, 4 Drawing Sheets

(56) References Cited

U.S. PATENT DOCUMENTS

| | | |
|---|---|---|
| 3,885,217 A | 5/1975 | Cintron |
| 3,894,190 A | 7/1975 | Gassmann |
| 3,919,479 A | 11/1975 | Moon et al. |
| 3,973,206 A | 8/1976 | Haselwood et al. |
| 4,048,562 A | 9/1977 | Haselwood et al. |
| 4,176,379 A | 11/1979 | Wessler et al. |
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |

(56) References Cited

U.S. PATENT DOCUMENTS

| | | |
|---|---|---|
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 * | 8/2002 | Petrovic .................. 382/100 |
| 6,430,302 B2 | 8/2002 | Rhoads |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,405 B1 | 6/2004 | Muratani et al. |
| 6,757,908 B1 | 6/2004 | Vogel |
| 6,760,463 B2 | 7/2004 | Rhoads |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,810,527 B1 | 10/2004 | Conrad et al. |
| 6,823,455 B1 | 11/2004 | Macy et al. |
| 6,829,368 B2 | 12/2004 | Meyer et al. |
| 6,829,582 B1 | 12/2004 | Barsness |
| 6,834,344 B1 | 12/2004 | Aggarwal et al. |
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 * | 6/2005 | Wang et al. .................. 382/100 |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 | 9/2005 | Epstein |
| 6,947,571 B1 | 9/2005 | Rhoads et al. |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |

(56) References Cited

U.S. PATENT DOCUMENTS

| | | |
|---|---|---|
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,123,718 B1* | 10/2006 | Moskowitz et al. .......... 380/205 |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,369,678 B2 | 5/2008 | Rhoads |
| 7,389,421 B2 | 6/2008 | Kirovski et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,756,272 B2 | 7/2010 | Kocher et al. |
| 7,788,684 B2 | 8/2010 | Petrovic et al. |
| 7,788,693 B2 | 8/2010 | Robbins |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,138,930 B1 | 3/2012 | Heath |
| 8,151,113 B2 | 4/2012 | Rhoads |
| 8,155,463 B2 | 4/2012 | Wong et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,315,835 B2 | 11/2012 | Tian et al. |
| 8,346,532 B2 | 1/2013 | Chakra et al. |
| 8,467,717 B2 | 6/2013 | Croy et al. |
| 8,538,066 B2 | 9/2013 | Petrovic et al. |
| 8,589,969 B2 | 11/2013 | Falcon |
| 2001/0001159 A1 | 5/2001 | Ford |
| 2001/0021926 A1 | 9/2001 | Schneck et al. |
| 2001/0022786 A1 | 9/2001 | King et al. |
| 2001/0025341 A1* | 9/2001 | Marshall ....................... 713/176 |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0010684 A1 | 1/2002 | Moskowitz |
| 2002/0012443 A1 | 1/2002 | Rhoads et al. |
| 2002/0019769 A1 | 2/2002 | Barritz et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0056213 A1 | 3/2003 | McFaddin et al. |
| 2003/0061489 A1 | 3/2003 | Pelly et al. |
| 2003/0063747 A1 | 4/2003 | Petrovic |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1* | 10/2003 | Odgers et al. ....................... 705/1 |
| 2003/0188166 A1 | 10/2003 | Pelly et al. |
| 2003/0190054 A1* | 10/2003 | Troyansky et al. .......... 382/100 |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |

(56) References Cited

U.S. PATENT DOCUMENTS

| | | |
|---|---|---|
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2004/0260930 A1* | 12/2004 | Malik et al. ............ 713/176 |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0071283 A1 | 3/2005 | Randle et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2005/0267928 A1 | 12/2005 | Anderson et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0219643 A1 | 9/2008 | Le Buhan et al. |
| 2008/0228733 A1 | 9/2008 | Davis et al. |
| 2008/0273861 A1 | 11/2008 | Yang et al. |
| 2008/0298632 A1 | 12/2008 | Reed |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0011217 A1 | 1/2010 | Tachibana et al. |
| 2010/0034513 A1 | 2/2010 | Nakano et al. |
| 2010/0069151 A1 | 3/2010 | Suchocki |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2010/0332723 A1 | 12/2010 | Lin et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0202687 A1 | 8/2011 | Glitsch et al. |
| 2011/0209191 A1 | 8/2011 | Shah |
| 2011/0214044 A1 | 9/2011 | Davis et al. |
| 2011/0214143 A1 | 9/2011 | Rits et al. |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0023595 A1 | 1/2012 | Speare et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |
| 2012/0203556 A1 | 8/2012 | Villette et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300977 A1 | 11/2012 | Petrovic et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0011006 A1 | 1/2013 | Petrovic et al. |
| 2013/0031579 A1 | 1/2013 | Klappert |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1 | 5/2013 | Lee et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0283402 A1 | 10/2013 | Petrovic |
| 2013/0339029 A1 | 12/2013 | Petrovic et al. |
| 2014/0029786 A1 | 1/2014 | Winograd |
| 2014/0067950 A1 | 3/2014 | Winograd |
| 2014/0071342 A1 | 3/2014 | Winograd et al. |
| 2014/0074855 A1 | 3/2014 | Zhao et al. |
| 2014/0075465 A1 | 3/2014 | Petrovic et al. |
| 2014/0075466 A1 | 3/2014 | Zhao |
| 2014/0075469 A1 | 3/2014 | Zhao |
| 2014/0229963 A1 | 8/2014 | Petrovic et al. |
| 2014/0237628 A1 | 8/2014 | Petrovic |
| 2014/0267907 A1 | 9/2014 | Downes et al. |
| 2014/0270337 A1 | 9/2014 | Zhao et al. |
| 2014/0270338 A1 | 9/2014 | Zhao et al. |
| 2014/0279296 A1 | 9/2014 | Petrovic et al. |
| 2014/0279549 A1 | 9/2014 | Petrovic et al. |

(56) References Cited

U.S. PATENT DOCUMENTS

| | | | |
|---|---|---|---|
| 2014/0325550 | A1 | 10/2014 | Winograd et al. |
| 2014/0325673 | A1 | 10/2014 | Petrovic |

FOREIGN PATENT DOCUMENTS

| | | |
|---|---|---|
| EP | 372601 | 6/1990 |
| EP | 581317 | 2/1994 |
| EP | 1137250 | 9/2001 |
| EP | 2166725 | 3/2010 |
| EP | 2605485 | 6/2013 |
| EP | 2653964 | 10/2013 |
| GB | 2260246 | 4/1993 |
| GB | 2292506 | 2/1996 |
| GB | 2358313 | 7/2001 |
| GB | 2363027 | 12/2001 |
| JP | 10-150548 | 6/1998 |
| JP | 11-086435 | 3/1999 |
| JP | 11-284516 | 10/1999 |
| JP | 11-346302 | 12/1999 |
| JP | 2000-069273 | 3/2000 |
| JP | 2000083159 | 3/2000 |
| JP | 2000-174628 | 6/2000 |
| JP | 2000163870 | 6/2000 |
| JP | 2000216981 | 8/2000 |
| JP | 2001022366 | 1/2001 |
| JP | 2001-119555 | 4/2001 |
| JP | 2001175270 | 6/2001 |
| JP | 2001-188549 | 7/2001 |
| JP | 2001-216763 | 8/2001 |
| JP | 2001-218006 | 8/2001 |
| JP | 2001245132 | 9/2001 |
| JP | 2001257865 | 9/2001 |
| JP | 2001-312570 | 11/2001 |
| JP | 2001-527660 | 12/2001 |
| JP | 2001339700 | 12/2001 |
| JP | 2002-010057 | 1/2002 |
| JP | 2002-024095 | 1/2002 |
| JP | 2002-027223 | 1/2002 |
| JP | 2002-091465 | 3/2002 |
| JP | 2002091712 | 3/2002 |
| JP | 2002100116 | 4/2002 |
| JP | 2002125205 | 4/2002 |
| JP | 2002135557 | 5/2002 |
| JP | 2002-165191 | 6/2002 |
| JP | 2002176614 | 6/2002 |
| JP | 2002-519916 | 7/2002 |
| JP | 2002-232693 | 8/2002 |
| JP | 2002232412 | 8/2002 |
| JP | 2002319924 | 10/2002 |
| JP | 2002354232 | 12/2002 |
| JP | 2003-008873 | 1/2003 |
| JP | 2003-039770 | 2/2003 |
| JP | 2003-091927 | 3/2003 |
| JP | 2003134461 | 5/2003 |
| JP | 2003-230095 | 8/2003 |
| JP | 2003-244419 | 8/2003 |
| JP | 2003-283802 | 10/2003 |
| JP | 2003316556 | 11/2003 |
| JP | 2003348324 | 12/2003 |
| JP | 2004-023786 | 1/2004 |
| JP | 2004070606 | 3/2004 |
| JP | 2004-163855 | 6/2004 |
| JP | 2004173237 | 6/2004 |
| JP | 2004-193843 | 7/2004 |
| JP | 2004194233 | 7/2004 |
| JP | 2004-328747 | 11/2004 |
| JP | 2005051733 | 2/2005 |
| JP | 2005-094107 | 4/2005 |
| JP | 2005525600 | 8/2005 |
| JP | 20080539669 | 11/2008 |
| JP | 20100272920 | 12/2010 |
| JP | 5283732 | 7/2013 |
| KR | 1020080087047 | 9/2008 |
| KR | 20100009384 | 1/2010 |
| KR | 1020120128149 | 11/2012 |
| WO | -94-10771 | 5/1994 |
| WO | -95-14289 | 5/1995 |
| WO | -97-09797 | 3/1997 |
| WO | -97-33391 | 9/1997 |
| WO | -98-53565 | 11/1998 |
| WO | -99-03340 | 1/1999 |
| WO | -99-39344 | 5/1999 |
| WO | -99-45706 | 10/1999 |
| WO | -99-62022 | 12/1999 |
| WO | -00-00969 | 1/2000 |
| WO | -00-13136 | 3/2000 |
| WO | -00-56059 | 9/2000 |
| WO | -01-54035 | 7/2001 |
| WO | 0150665 | 7/2001 |
| WO | -01-55889 | 8/2001 |
| WO | 0197128 | 12/2001 |
| WO | 0219589 | 3/2002 |
| WO | 0223883 | 3/2002 |
| WO | 0249363 | 6/2002 |
| WO | 0295727 | 11/2002 |
| WO | 03052598 | 6/2003 |
| WO | 03102947 | 12/2003 |
| WO | 2005017827 | 2/2005 |
| WO | -05-27501 | 3/2005 |
| WO | 2005038778 | 4/2005 |
| WO | 2006051043 | 5/2006 |
| WO | 2006116394 | 11/2006 |
| WO | 2010073236 | 7/2010 |
| WO | 2011116309 | 9/2011 |
| WO | 2013067439 | 5/2013 |
| WO | 2013090462 | 6/2013 |
| WO | 2013090466 | 6/2013 |
| WO | 2013090467 | 6/2013 |
| WO | 2014144101 | 9/2014 |
| WO | 2014153199 | 9/2014 |
| WO | 2014160324 | 10/2014 |

OTHER PUBLICATIONS

International Search Report and Written Opinion dated Jan. 4, 2008 for International Application No. PCT/US2006/015615, filed Apr. 25, 2006 (5 pages).

International Search Report and Written Opinion dated Mar. 14, 2013 for International Application No. PCT/US2012/069308, filed Dec. 12, 2012 (10 pages).

International Search Report and Written Opinion dated Mar. 18, 2013 for International Application No. PCT/US2012/063431, filed Nov. 2, 2012 (10 pages).

International Search Report and Written Opinion dated Mar. 25, 2013 for International Application No. PCT/US2012/069302, filed Dec. 12, 2012 (22 pages).

International Search Report and Written Opinion dated Mar. 28, 2012 for International Application No. PCT/US2011/051855, filed Sep. 15, 2011 (8 pages).

International Search Report and Written Opinion dated May 13, 2008 for International Application No. PCT/US2006/025090, filed Jun. 27, 2006 (2 pages).

International Search Report and Written Opinion dated May 19, 2004 for International Application No. PCT/US2003/031816, filed Apr. 29, 2004 (3 pages).

International Search Report and Written Opinion dated May 29, 2008 for International Application No. PCT/US2006/015410, filed Apr. 21, 2006 (6 pages).

International Search Report and Written Opinion dated Sep. 26, 2008 for International Application No. PCT/US2007/016812, filed Jul. 25, 2007 (6 pages).

Jacobsmeyer, J., et al., "Introduction to error-control coding," Pericle Communications Company, 2004 (16 pages).

Kalker, T., et al., "A security risk for publicly available watermark detectors," Proc. Benelux Info. Theory Symp., Veldhoven, The Netherlands, May 1998 (7 pages).

Kalker, T., et al., "System issues in digital image and video watermarking for copy protection," Proc. IEEE Int. Conf. on Multimedia Computing and Systems, pp. 562-567, Jun. 1999.

(56) References Cited

OTHER PUBLICATIONS

Kim, T.Y., et al., "An asymmetric watermarking system with many embedding watermarks corresponding to one detection watermark," IEEE Signal Processing Letters, 3(11):375-377, Mar. 2004.

Kirovski, D., et al., "Multimedia content screening using a dual watermarking and fingerprinting system," Proceedings of the tenth ACM international conference, pp. 372-381, 2002.

Kirovski, D., et al., "Randomizing the replacement attack," ICASSP, pp. 381-384, 2004.

Kirovski, D., et al., "Robust spread-spectrum audio watermarking," IEEE International Conference on Acoustics, Speech, and Signal Processing, 3:1345-1348, 2001.

Kirovski, D., et al., "Multimedia content; screening using a dual watermarking and fingerprinting system," Multimedia '02 Proceedings of the tenth ACM international conference on Multimedia, 2002 (11 pages).

Kocher, P., et al., "Self-Protecting Digital Content: A Technical Report from the CRI Content Security Research Initiative," Cryptography Research, Inc. (CRI), 2002-2003 (14 pages).

Kutter, M., et al., "The watermark; copy attack," Proc. of the SPIE: Security and Watermarking of Multimedia Content II, 3971:1-10, Jan. 2000.

Kuznetsov, A.V., et al., "An error correcting scheme for defective memory," IEEE Trans. Inf. Theory, 6(4):712-718, Nov. 1978 (7 pages).

Lacy, J., et al., "Intellectual property protection systems and digital watermarking," Proceedings: Information Hiding, Second International Workshop, Portland, Oregon, pp. 158-168, 1998.

Lin, E.T., et al., "Detection of image alterations using semi-fragile watermarks," Proceedings of the SPIE International Conference on Security and Watermarking of Multimedia Contents II, Jan. 2000 (12 pages).

Lin, P.L., et al., "Robust transparent image watermarking system with spatial mechanisms," The Journal of Systems and Software, 50:107-116, Feb. 2000.

Lotspeich, J., "The Advanced Access Content System's Use of Digital Watermarking," MCPS '06, Oct. 28, 2006, pp. 19-21.

Lu, C.S., et al., "Oblivious cocktail watermarking by sparse code shrinkage: A regional-and global-based scheme," IEEE Transactions on Multimedia, 4(2):209-224, Dec. 2000.

Mason, A. J., et al., "User requirements for watermarking in broadcast applications," IEEE Conference Publication, International Broadcasting Convention (BC 2000), Amsterdam, Sep. 8-12, 2000 (7 pages).

Mintzer, F., et al., "If one watermark is good, are more better?," Acoustics, Speech, and Signal Processing, ICASSP, 4:2067-2069, Mar. 1999.

Mobasseri, B.G., et al. "Content authentication and tamper detection in digital video," Image Processing Proceedings, International Conference, 1:458-461, 2000.

Moulin, P., et al., "Detection-theoretic analysis of desynchronization attacks in watermarking," Technical Report MSR-TR-2002-24, Microsoft Corporation, Mar. 2002.

Muranoi, R., et al., "Video retrieval method using shotID for copyright protection systems," Proc. SPIE Multimedia Storage and Archiving Systems III, 3527:245-252, Nov. 1998.

Nikolaidis, N., et al., "Watermark detection: benchmarking perspectives," 2002 IEEE Conference on Multimedia and Expo, 2002 (4 pages).

Office Action dated Jan. 20, 2014 for Japanese Patent Application No. 2013-036990 (6 pages).

Office Action dated Jul. 21, 2011 for Japanese Patent Application No. 2008-508985 (6 pages).

Office Action dated Mar. 16, 2012 for Japanese Patent Application No. 2008-508985 (8 pages).

Office Action dated Mar. 18, 2011 for European Patent Application No. 03774648.4 (6 pages).

Office Action dated May 1, 2013 for Japanese Patent Application No. 2011-114667 (6 pages).

Office Action dated Nov. 26, 2012 for Japanese Patent Application No. 2011-114667 (8 pages).

Office Action dated Nov. 28, 2012 for Japanese Patent Application No. 2011-114666 (8 pages).

Park, J.H., et al., "Robust and fragile watermarking techniques for documents using bidirectional diagonal profiles," Information and Communications Security: Third International Conference, Xian, China, Nov. 2001, pp. 483-494.

Perez-Gonzalez, F., et al., "Approaching the capacity limit in image watermarking a perspective on coding techniques for data hiding applications," Signal Processing, 6(81):1215-1238 Jun. 2001.

Petitcolas, F.A.P., et al., "Attacks; on copyright marking systems," Second Workshop on Information Hiding, Lecture Notes in Computer Science, Portland, Oregon, pp. 218-238, Apr. 1998.

Philips Research Liquid Audio Fraunhofer Institute, "Digital Audio Screening Technology for Phased Rollout," Version 1.00, May 1999 (38 pages).

Pytlak, J., "Anti-piracy coding," http://www.tele.com/pipermail/tig/2003-November/003842.html; Nov. 2003 (2 pages).

RSA Laboratories, "Frequently asked questions about today's cryptography," Version 4.1, May 2000 (37 pages).

Schneier, B., "Applied cryptography, second edition: protocols, algorithms and source code in C," Oct. 1995 (10 pages).

Seok, J., et al., "A novel audio watermarking algorithm for copyright protection of digital audio," ETRI Journal, 24(3):181-189, Jun. 2002.

Shih, F.Y., et al., "Combinational, image watermarking in the spatial and frequency domains," Pattern Recognition, 36:696-975, May 2002.

Spangler, T., "Social Science," http://www.multichannel.com/content/social-science, Sep. 2011 (5 pages).

Steinebach, M., et al., "StirMark benchmark: audio; watermarking attacks," International Conference on Information Technology: Coding and Computing (ITCC 2001), Las Vegas, Nevada, Apr. 2001 (6 pages).

Das, et al., "Distributed Priority Queues on Hybercube Architectures," IEEE, 1996, pp. 620-627.

Maehara, F., et al., "A proposal of multimedial home education terminal system based on flash-squeak OS," Technical report of the institute of image information and television engineers, 28(43):21-24, Jul. 2004.

Office Action dated May 8, 2012 for Japanese Patent Application No. 2009-522802 (4 pages).

European Search Report dated Apr. 12, 2012 for European Patent Application No. 07836262.1 filed Jul. 25, 2007 (12 pages).

"Advanced Access Content System (AACS), Pre-recorded Video Book," Revision 0.951, Sep. 2009 (86 pages).

"Civolution's 2nd screen synchronisation solution wins CSI product of the year 2011 award at IBC," IBC Press Release, Hall 2—Stand C30, Sep. 2011 (2 pages).

"Content Protection—Self Protecting Digital Content," http://www.cryptography.com/technology/spdc/index.html, May 2010 (1 page).

"Microsoft response to CfP for technology solutions to screen digital audio content for LCM acceptance," Microsoft Corporation, May 23, 1999 (9 pages).

"Red Bee and Civolution develop companion app for FX UK," http://www.digitaltveurope.net/19981/red-bee-and-civolution-develop-companion-app-for-fx-uk, Jan. 2012 (2 pages).

"Task AC122-copy protection for distribution services," Http://acad.bg/WISE/english/rd/partners/acts/areal/ac122-t.html, Jul. 1, 1997 (2 pages).

Adelsbach, A., et al., "Proving Ownership of Digital Content," Proc. 3rd Int. Workshop on Information Hiding, 1768:117-133, Sep. 1999.

Aggarwal, A., et al., "Multi-Layer Grid Embeddings," Foundations of Computer Science, 26th Annual Symposium on Foundations of Computer Science, 85:186-196, Oct. 1985.

Aris Technologies, Inc. "Audio Watermarking System to Screen Digital Audio Content for LCM Acceptance," May 1999 (17 pages).

Bangaleea, R., et al., "Performance improvement of spread spectrum spatial-domain watermarking scheme through diversity and attack characterisation," IEEE Africon, pp. 293-298, 2002.

Barreto, P.S.L.M., et al. "Toward Secure Public-Key Blockwise Fragile Authentication Watermarking," IEEE Proceedings Vision, Image, and Signal Processing, 149(2):57-62, Apr. 2002.

(56) References Cited

OTHER PUBLICATIONS

Boney, L., et al., "Digital Watermarks for Audio Signals," Dept. of Electrical Engineering, Univ. of Minnesota, Mar. 1996 (4 pages).
Cappellini, V., et al. "Robust Frame-based Watermarking for Digital Video," Proceedings of the 12th International Workshop on Database and Expert Systems Applications, Sep. 2001 (5 pages).
Caronni, G., "Assuring Ownership Rights for Digital; Images," Proceedings of reliable IT systems VIS 95, Vieweg Publishing Company, Germany, 1995 (10 pages).
Chou, J., et al., "A Robust Blind Watermarking Scheme based on Distributed Source Coding Principles," Multimedial 2000 Proceedings of the eighth ACM international conference on multimedia, Los Angeles, California, 2000 (8 pages).
Chou, J., et al., "A Robust Optimization Solution to the Data Hiding Problem using Distributed Source Coding Principles," Pro. SPIE, 3971, San Jose, California, Jan. 2000 (10 pages).
Cinea, Inc., "Forensic watermarking deterring video piracy," 2004, (9 pages).; [http://www.cinea.com/whitepapers/forensic_watermarking.pdf].
Costa, M., "Writing on Dirty Paper," IEEE Trans. on Info. Theory, 29(3):439-441, May 1983.
Cox, I. J., et al., "Some general methods for tampering with watermarks," IEEE Journal on Selected Areas in Communications, 16(4): 587-593, May 1998.
Coxford, A., et al., "Advanced Mathematics: A Preparation for Calculus, Second Edition," Harcourt Brace Jovanovish, Inc., 1978 (14 pages).
Davidson, M.F., "Music File Filter," Sony Music, New York, May 23, 1999 (2 pages).
Digimarc Corporation, "Digimarc Watermarking Guide," 1999 (22 pages).
Dittmann, J., "Combining digital watermarks and collusion secure fingerprints for customer copy monitoring," Proc. IEEE Seminar on Secure Images and Image Authentication, Apr. 2000 (6 pages).
Dittmann, J., et al., "Combining digital watermarks and collusion secure fingerprints for digital images," Proc. SPIE 3657:171-182, Jan. 1999 (12 pages).
Epp, L.W., et al., "Generalized scattering matrices for unit cell characterization of grid amplifiers and device de-embedding," IEEE, 2:1288-1291, Jun. 1995.
European Search Report dated Jul. 3, 2012 for European Patent Application No. 12150742.0, filed Oct. 7, 2003 (5 pages).
European Search Report dated Nov. 10, 2010 for European Patent Application No. 03774648.4, filed Oct. 7, 2003 (5 pages).
European Search Report dated Nov. 8, 2012 for European Patent Application No. 06785709.4, filed Jun. 27, 2006 (5 pages).
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
Furon, T., et al., "An asymmetric watermarking; method," IEEE Trans. Signal Processing, 4(51):981-995, Apr. 2003.
Guth, H.J., et al., "Error-and collusion-secure fingerprinting for digital data," Proc. 3rd Int. Workshop on Information Hiding, LNCS 1768:134-145, Sep./Oct. 1999.
Hartung, F., et al., "Digital watermarking of MPEG-2 coded video in the bitstream domain," Proc. IEEE Int. Conf. on Acoustics, Speech and Signal Processing, 4:2621-2624, Apr. 1997.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
Heegard, C., et al., "On the capacity of computer memory with defects," IEEE Trans. Info. Theory, 5(IT-29):731-739, Sep. 1983.
International Search Report and Written Opinion dated Sep. 12, 2014 for International Application No. PCT/US2014/035474, filed Apr. 25, 2014 (17 pages).
International Search Report and Written Opinion dated Sep. 15, 2014 for International Application No. PCT/US2014/035539, filed Apr. 25, 2014 (16 pages).
International Search Report and Written Opinion dated Apr. 24, 2012 for International Application No. PCT/US2011/051857, filed Sep. 15, 2011 (9 pages).
International Search Report and Written Opinion dated Apr. 8, 2013 for International Application No. PCT/US2012/069306, filed Dec. 12, 2012 (12 pages).
International Search Report and Written Opinion dated Aug. 14, 1998 for International Application No. PCT/US1998/009587, filed May 12, 1998 (3 pages).
International Search Report and Written Opinion dated Aug. 25, 2014 for International Application No. PCT/US2014/029564, filed Mar. 14, 2014 (10 pages).
International Search Report and Written Opinion dated Aug. 22, 2007 for International Application No. PCT/US2006/031267, filed Aug. 9, 2006 (2 pages).
International Search Report and Written Opinion dated Aug. 25, 2013 for International Application No. PCT/US2014/026322, filed Aug. 25, 2014 (12 pages).
International Search Report and Written Opinion dated Aug. 8, 2014 for International Application No. PCT/US2014/028372, filed Mar. 14, 2014 (18 pages).
International Search Report and Written Opinion dated Feb. 14, 2002 for International Application No. PCT/US2001/026505, filed Aug. 27, 2001 (2 pages).
Tanaka, K., et al., "Secret transmission method of character data in motion picture communication," SPIE Visual Communications and Image Processing '91, 1605:646-649, 1991.
Tsai, M.J., et al., "Wavelet packet and adaptive spatial transformation of watermark for digital image authentication," IEEE Image Processing, 2000 International Conference, 1:450-453, 2000 (4 pages).
Verance Corporation, "Confirmedia," PowerPoint presentation made to National Association of Broadcasters, Apr. 24, 2001 (40 pages).
Wang, X, et al., "Robust correlation of encrypted attack traffic through stepping stones by manipulation of interpacket delays," Proceedings of the 10th ACM conference on computer communications security, Oct. 27-30, 2003, Washington D.C., USA.
Wolfgang, R., et al., "Perceptual watermarks for digital images and video," Proceedings of the IEEE, 87 (7):1108-1126, Jul. 1999.
Xu, C., et al., "Applications of digital watermarking technology in audio signals," Journal of Audio Eng. Soc., 10 (47):805-812, Oct. 1999.
Yeung, M. M., et al., "An invisible watermarking technique for image verification," Image Processing, International Conference Proceedings, 2:680-683, Oct. 26-29, 1997.
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).
Chen, B. et al., "Quantization index modulation: a class of provably good methods for digital watermarking and information embedding," IEEE Transactions on Information Theory, 47(4):1423-1443, May 2001.
Kang, X., et al., "A DWT-DFT composite watermarking scheme robust to both affine transform and JPEG compression," IEEE Transactions On Circuits and Systems For Video Technology, 8(13):776-786, Aug. 2003.
Petitcolas, F., et al., "The blind pattern matching attack on watermark systems," IEEE Trans. Signal Processing, Apr. 2003 (4 pages).
Solanki, K., et al., "Robust image-adaptive data hiding: modeling, source coding and channel coding", 41st Allerton Conference on Communications, Control and Computing, Oct. 2003 (10 pages).

* cited by examiner

FORENSIC MARKING USING A COMMON CUSTOMIZATION FUNCTION

CROSS REFERENCE TO RELATED APPLICATIONS

This application is a continuation (and claims the benefit of priority under 35 USC 120) of U.S. patent application Ser. No. 13/220,526, filed on Aug. 29, 2011, now U.S. Pat. No. 8,549,307, which is a continuation of U.S. patent application Ser. No. 11/479,958, filed on Jun. 30, 2006, now U.S. Pat. No. 8,020,004, which claims the benefit of U.S. Provisional Application Ser. No. 60/696,146, filed on Jul. 1, 2005. The disclosure of the prior applications are considered part of (and are incorporated by reference in) the disclosure of this application.

BACKGROUND OF THE INVENTION

The present invention relates generally to systems, methods and apparatus for providing forensic markings for media content. Forensic marking is the practice of creating individual copies of information content that are substantially identical for most practical purposes, but that can in fact be distinguished from one another in order to ascertain information about their chain-of-custody subsequent to their distribution. For example, intentionally introduced errors in logarithmic tables were used in previous centuries to prove that certain publications of those tables had been copied from a particular source without authorization from the table's creator. In the modern era, forensic marking is widely viewed as an important technique for protection of valuable media information content such as movies, music, programming, documents, and other digital information content such as software and data files and has convincingly demonstrated its commercial efficacy. Forensic marking is typically intended to assist in locating a point in the chain-of-custody where an unauthorized use of the content occurred.

A wide range of schemes have been proposed for introducing identifiable marks into content and for subsequently identifying their presence. The broad class of techniques commonly known as "watermarking", wherein auxiliary data is imperceptibly embedded into the content, are most commonly associated with this task, however a range of different approaches are possible. An exemplary methodology that does not incorporate watermarking is to simultaneously capture one or more scenes in a film production by employing two cameras at different locations and using these similar recordings as alternately selectable versions of content for the purpose of distinguishing copies. Another approach that can be employed with video content is to superimpose a figure or graphic onto the image that is either brief and unnoticeable (such as the "cap coding" dots that are reported to be employed in commercial film production) or that is innocuous (such as superimposing an additional face in a crowd or changing the color of a chair).

Various forensic marking schemes offering differing performance and capabilities with respect to: the types of content to which they are applicable (e.g., video, audio, textual, images, executable program instructions, data, etc.); the degree of transparency or interference of the marking with respect to primary intended purpose of the content; the payload capacity of the marking (e.g., number of uniquely marked copies that can be generated and the amount of the marked content necessary to identify the mark); the effort required to apply or identify the mark (e.g., the computational complexity of insertion or detection of the forensic mark); the recoverability of the mark following incidental use and modification of the content ("robustness"); or the resistance of the mark to attempts to interfere with its use ("security") through forgery, modification, eavesdropping, and erasure.

In many practical circumstances, the marking must be performed under tight constraints. For example, when a high volume of individually marked copies of content must be created, it is desirable that each should be made as effortlessly as possible to minimize time, expense or resource usage. Additionally, when a copy of content must be marked at the time of its delivery or use, it is typically important that the marking occur with minimal effort so as not to delay the delivery or interfere with other simultaneous actions associated with the event. For example, on a computer server system that provides copies of content in response to requests received over a network, the effort required to supply a distinctly marked copy in response to individual requests may substantially increase the amount of processing and/or storage required to respond to a given number of requests, versus simply providing the same copy of the content in response to each, as is more typically done. Similarly, if the marking must be applied using digital electronics embedded within a consumer device such as a personal computer, portable music player, or multimedia-enabled cellular telephone, it is important that the process of customizing individual copies does not interfere with or limit other device functions, including in the areas of computing processor utilization, power consumption, or user-interface response time.

A valuable approach to minimizing the effort in forensic marking is to divide the forensic marking activity into two steps. The first step performs a "pre-processing" of the content that only needs to be performed once and may require substantial effort in order to produce one or more versions of the content and possibly also to analyze data that can be used in a subsequent "customization" step of reduced effort that is repeated with minor variations to produce the forensically marked copies of the content. While the customization step of a two-step forensic marking scheme is not inherently limited to any particular operation, some examples of common functions that may be typically included in such an arrangement include splicing of regions of content together, replacement of certain regions of content with regions taken from other content, mathematical addition of regions of content, mathematical additional of a region taken from content with the mathematical multiplication of two other content regions, and the like. This approach is generally employed in an arrangement where the pre-processing and customization steps are performed on separate physical devices and at different stages of the chain of production, distribution, and consumption of content.

Another critical consideration in forensic marking is the vulnerability of marking techniques to subversion through various avenues of attack by individuals seeking to thwart identification of the forensic mark. Such attacks may by implemented by a variety of means, but typically involve transforming the content such that the mark is altered or obscured.

It is generally advantageous to an attacker making an attack on a marking technique if they have knowledge of the details of the marking technique employed, and for this reason it is desirable for the efficacy of the system that as much information about the marking techniques employed for any particular content instance be unavailable to them. Generally, in order to avoid exposure of marking methods, tamper-resistant implementation techniques are employed in order to protect devices that perform marking and information stored internally from reverse engineering. However, a particular advantage of the two-step forensic marking approach for environments where marking is performed in a device that may be attacked is that it is possible for many of the sensitive technologies to be employed during the pre-processing step, which can be retained under the control of the content distributor, and the information regarding the marking scheme that needs to be present in the device that performs customization can be much more limited. Furthermore, cryptographic techniques may be used to enhance the security of the forensic marking system. For example, the information that is delivered to a particular customization device, including all alternate versions of the original content signal plus functions and parameters that are necessary to effect the marking, may be encrypted and the particular customization device may be required to request the delivery of proper decryption keys upon the exchange of proper identification and authentication information. Further, through encryption of alternate versions of the content with different keys and by providing the customization function with only the decryption keys associated with the versions of content that are used to form mark messages that the device is authorized to render, the security impact of a compromised customization device may be substantially diminished. In such a scenario, the attacker may be unable to access any content elements other than those that are specifically accessible to the compromised device.

Nevertheless, a number of factors may still frustrate efforts to keep secret information out of an attacker's hands. Attackers may be able to learn about particular marking technologies from any of many different sources, including leaks of confidential information, from information included in patent filings, from reverse engineering of devices that perform marking or mark detection functions, or from analysis of marked content (including, in particular, comparative analysis or combined processing of differently marked versions of the same content, the so called "collusion" attacks).

If only a single marking technique is employed, then the emergence of a successful attack may be immediate and catastrophic. Thus, it may be advantageous to employ a multiplicity of marking techniques across a range of content and devices at any given point in time. Further, if the marking technique employed is fixed, its resistance to attack will only diminish over time as information on its function is slowly gleaned by attackers. Thus it may be advantageous to be able to change marking techniques employed on a time schedule that is responsive to progress made by attackers over time.

There are additional practical considerations related to the use of forensic marking schemes. It may be desirable for the manufacturer of some product that processes content to facilitate the forensic marking of the content using a variety of different schemes. For example, the various owners or distributors of different content processed by the device might want different schemes to be used in connection with particular content which they provide for use on the device, and those wishes might change over time due to purely commercial considerations. Additionally, different types of content (such as 3 minute popular music songs versus 8 hour audiobooks) might introduce entirely different marking requirements because of their duration, bandwidth, attack threat model, commercial value, sales volume, or some other consideration. For the manufacturer of such a device, it may be impractical, burdensome, or even impossible to include sufficient capability to support all desired forensic marking schemes and a capability to update the devices functions over time, even if the marking schemes permit separate pre-processing and customization such that the device need only perform the customization steps of the various forensic marking schemes.

Clearly, if the customization step is carried out on a general-purpose programmable device, such a device may be reprogrammed at various times to apply different forensic marking techniques. Such reprogramming might be performed or even provided in conjunction with each particular piece of content, if programming instructions are provided along with the content. However, if the marking must be performed on a variety of different types of programmable devices, it may be impractical or burdensome to provide instructions for each different programmable device.

It has been proposed that a desirable method of flexibly applying forensic marking is through inclusion of a common programmable capability or so-called "virtual machine" that can execute arbitrary data processing functions expressed in program code delivered with content, including those that customize pre-processed, encrypted content in order to achieve forensic marking. This approach places a substantial burden of complexity on the device that performs customization, which must implement the virtual machine and be capable of executing the arbitrary program instructions. Additionally, it places a burden on the content producer and forensic scheme technology developer for devising program instructions and ensuring their correctness, tasks that are generally difficult, expensive, and error-prone.

Another proposed approach to the flexible application of forensic marking in a diverse range of devices is the creation of a standardized, common function that can perform a complete forensic marking operation on content in response to marking instructions provided with the content. This approach employs a set of common, fixed data processing primitives with adjustable parameters that are believed to support a range of commercially useful forensic watermark embedding schemes. This approach provides reduced complexity with respect to the development and testing of marking instruction streams in comparison with an approach that employs a generic "virtual machine," but has several other significant drawbacks. First, the range of marking techniques that such a device can support will be inherently limited by the scope of the available primitives. As pointed out herein, a very wide range of methods have been proposed for watermarking, not to mention forensic marking generally, and diversity in the area of marking techniques is of benefit to mark security and commercial acceptability. The limitation of the fundamental method of forensic marking to a finite set that can be incorporated in a standardized specification substantially limits the efficacy and practicality of the system.

Also, the amount of processing required for many practical forensic watermarking techniques is substantial, and inclusion of the complete forensic mark application within the device responsible for content customization may have a significant negative impact on the cost and/or performance of such devices. For example, the embedding function in many practical watermarking schemes rely on perceptual modeling of the content being marked to constrain the amplitude of modifications to an amount that results in an acceptable level of perceptual distortion. Such modeling may be difficult to express in a generic messaging language, may require substantial processing and memory resources, and may introduce significant processing latency. This impact may make such an approach unsuitable for large classes of devices, such as portable media players, cellular phones, optical media players, handheld recording devices, and the like.

It would be advantageous to provide flexible forensic watermarking methods, systems and apparatus which are designed to overcome various deficiencies of the prior art systems. More specifically, it would be advantageous to be able to flexibly employ a range of different marking techniques in different instances that all rely on a common customization function that is applicable to a wide range of forensic marking schemes (and consequently, a wide range of pre-processing methods), but that support a well-defined set of functions specific to the task of forensic mark customization that can be carried out with a modest and preferably bounded effort on a wide range of devices. Because a very wide range of techniques are used for marking content, there has previously been no practical way to address these challenges. The present invention achieves such desirable features through the use of a generic transformation technique for use as a "customization" step for producing versions of content forensically marked with any of a multiplicity of mark messages, wherein the customization function is responsive to instructions provided along with pre-processed content that enable its compatibility with a range of different forensic marking schemes.

The methods, systems and apparatus of the present invention provide the foregoing and other advantages.

SUMMARY OF THE INVENTION

The present invention provides methods, systems, and apparatus which enable flexible insertion of forensic watermarks into a digital content signal by using a common customization function.

In an example embodiment of the present invention, a method for producing a distinctly marked content is provided. A plurality of tributaries and customization information are received (e.g., at a client device, a user location, a discrete processing element at the same location, or the like). The tributaries and customization information are processed using a common customization function adapted to accept a mark message in order to produce a distinctly marked content.

The plurality of tributaries and the customization information may be produced by pre-processing original content. Alternatively, the plurality of tributaries and the customization information may be produced by pre-processing the original content with at least one alternate content element. The tributaries may be derived from the alternate content elements.

The pre-processing function may comprise embedding at least a logical value in a portion said original content. The tributaries may be synthesized during the pre-processing.

The tributaries may comprise instructions for generating at least one alternate version of the original content or an alternate content element.

The method may further comprise analyzing the tributaries and customization information to obtain validation information. The validation information may comprise resource allocation profiles. Further, the validation information may represent compatibility profiles.

The processing of the tributaries and customization information may comprise selecting a subset of the tributaries, generating rendering information in accordance with the customization information and the mark message, and rendering the selected tributaries in accordance with the rendering information to form the distinctly marked content.

The selecting may be conducted in accordance with the customization information and the mark message. The selecting may also be conducted in accordance with a set of nexus resolution instructions.

The rendering may comprise assembling the selected tributaries in accordance with the rendering information. Assembling the tributaries may comprises at least one of adding, multiplying, splicing or blending of the selected tributaries.

The rendering may be conducted in accordance with a set of assembly instructions. These assembly instructions may correspond to at least one of a PDF, XML, MXF, AAF, ASF, BWF, and Mobile XMF encoding formats. The rendering may comprises post-processing operations to enhance the security of the distinctly marked content. The rendering may further comprises post-processing operations to enhance the transparency of the embedded marks within the distinctly marked content.

The mark message may be encoded in accordance with at least one of an error correction coding, a channel coding, a data security protocol, or the like. The encoding of the mark message may be conducted using a look-up table.

In a further example embodiment of the present invention, an apparatus for producing a distinctly marked content is provided. The apparatus comprises means for receiving a plurality of tributaries and customization information produced by a pre-processing function and processing means for processing the tributaries and customization information using a common customization function adapted to accept a mark message in order to produce a distinctly marked content.

In another example embodiment of the present invention, a method for enabling the production of a distinctly marked content is provided. In such an embodiment, an original content is received (e.g., by transmission over a wired or wireless network, from a storage element, from another device or functional element, or the like). This original content, once received, is then pre-processed to produce a plurality of tributaries and customization information. The tributaries and customization information enable the production of a distinctly marked content (e.g., using a common customization function as discussed in the above-described embodiments).

The plurality of tributaries and the customization information may be produced by pre-processing the original content with at least one alternate content element. The tributaries may be derived from the alternate content elements.

Methods, apparatus, and systems corresponding to the foregoing example embodiments, and to combinations of the foregoing example embodiments, are encompassed by the present invention.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
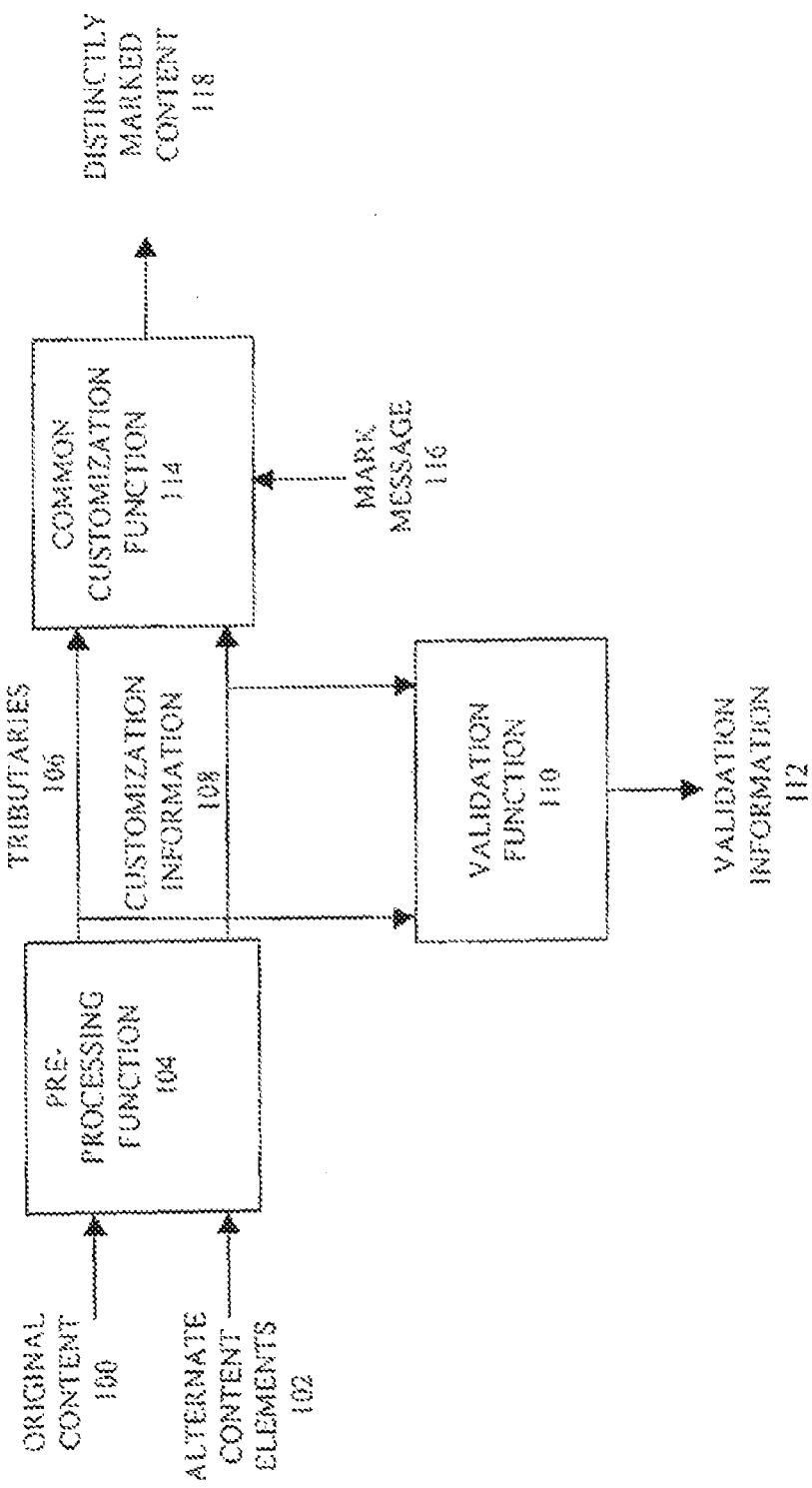
FIG. 1 illustrates a general block diagram overview of the forensic marking system in accordance with an example embodiment of the invention.

FIG. 1 illustrates a high-level block diagram of the forensic marking technique of the present invention. The original content 100 is pre-processed by a pre-processing function 104, optionally in combination with alternate content elements 102, to obtain a multiplicity of tributaries 106 and associated customization information 108. The tributaries 106 and customization information 108 are utilized by a common customization function 114 to produce distinctly marked content 118 that carries any of a multiplicity of identifiable mark messages 116. The original content 100 and alternate content elements 102 may be any type of data, signal, or information; however typical embodiments will for practical reasons be limited in applicability to a limited set of data or information types. The tributaries 106 and customization information 108 are represented in a well-defined format that permits independent validation of its compliance with various protocol requirements by a validation function 110, if desired, prior to its application to the common customization function 114. The relationship between the pre-processing function 104, validation function 110 (when present), and common customization function 114 is illustrated in FIG. 1.

It should be appreciated that while FIG. 1 and the other figures may accurately represent the physical relationships between various components for an example apparatus of the present invention, it is understood that these figures may also illustrate conceptual or logical relationships between various elements of the invention. For example, boxes may correspond to functions, which may be either discretely implemented or integrated with other functions, and arrows may correspond to the flow of information, either by value or by reference. Other relationships, functions, and data paths may also be present in the device which are not shown in the figures including, for example, connectivity to external information sources for control or recording of device activities and access to content-specific information such as encryption and decryption keys.

Pre-Processing

The pre-processing function 104 performs operations on the original content and, optionally, alternate content elements 102, to obtain tributaries 106 and customization information 108. The pre-processing function 104 may include all or a portion of any of a wide variety of forensic marking techniques, but its essential characteristic is that its output should be designed such that the processing of its output by a pre-defined common customization function 114 will result in the production of content that has been forensically marked with any of a multiplicity of mark messages 116.

Original content 100 is the content that would serve as the basis for all copies being produced, but for the use of a forensic marking scheme. Alternate content elements 102 are versions of all or a portion of the original content 100 that are distinguishable from the original content 100, but may be employed to modify or replace all or a portion of the original content 100 for purposes of forensic marking. The term "tributary" is used in this context to mean data that can be combined in various ways to produce distinctly marked versions of the original content 100 using methods provided by the common customization function 114. Tributaries 106 may be derived from the original content 100 or alternate content elements 102, synthesized by the pre-processing function 104, they may be an encrypted or encoded representation of content, or may comprise a method or instructions for generating an alternate version of the original content or alternate content elements. In addition, the tributaries may be produced from any combination of the aforementioned methods. Additionally, tributaries 106 may be distinguished from one another either physically (for example, as separate data structures in a storage medium) or logically (for example, as regions of a continuous data structure that may be distinguished with the use of ancillary data such as markers, pointers, formulae or other explicit and implicit means).

The customization information 108 represents instructions to the common customization function 114 as to how the tributaries 106 should be combined for various mark data values that comprise the mark message 116. One of the benefits of the present invention is that the pre-processing function 104 is not in any way fixed and could implement a multitude of marking schemes in current existence or to be created in the future. The only limitation is that the marking schemes associated with the pre-processing function 104 must be compatible with a customization technique within the capabilities of the common customization function 114. Thus, the scope of the present invention with respect to operations performed by the pre-processing function 104 is considered to encompass any operation for which there exists a complementary processing capability in the common customization function 114, as described herein (e.g., the selection and application of appropriate compression of tributaries 106 for decompression by the common customization function 114, etc.).

Customization

The marking techniques in accordance with the present invention involve the use of a common customization function 114 whose processing behavior in a given instance is controlled by specified customization information 108. The range of valid customization information 108 and the processing behavior of the common customization function 114 in response to the customization information 108 is primarily fixed and well-defined. The capability of using a range of different customization information 108 enables a common customization method to be employed with a variety of different forensic marking schemes. The limited set of functions performed by the common customization function 114 permits its operation to be reasonably bounded and efficient. This configuration permits the common customization function 114 to be implemented in a fixed device and correctly perform the customization step on appropriately pre-processed information for a range of different forensic marking schemes.

Figure 2:
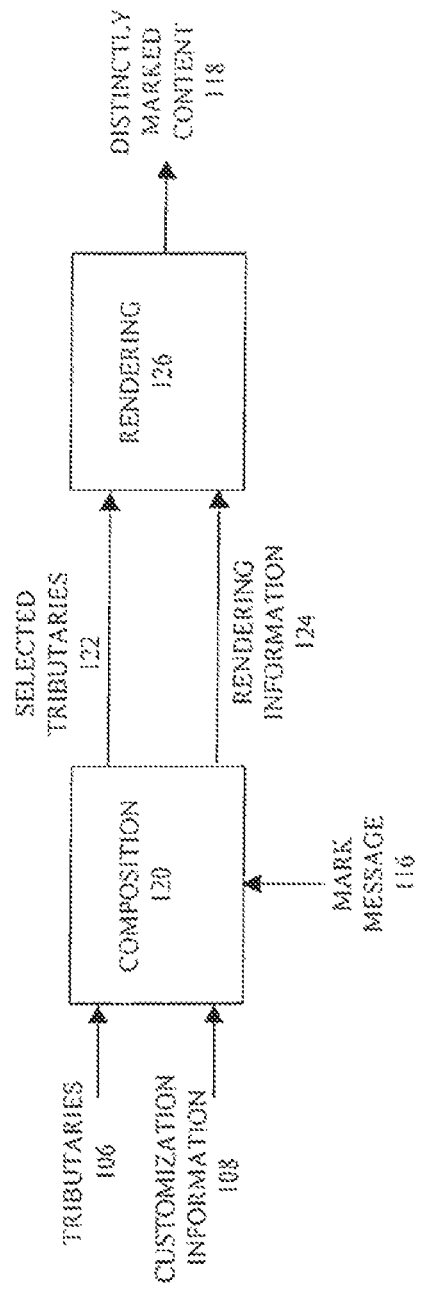
FIG. 2 shows a block diagram describing elements of the common customization function of FIG. 1 in accordance with an example embodiment of the invention.

An exemplary block diagram of the common customization function 114 in accordance with the present invention is described in FIG. 2. The common customization function 114 performs the acts of 'Composition' 120, which is the process of determining the manner in which available tributaries 106 are combined, and 'Rendering' 126, which is the process wherein the formation occurs to produce a distinctly marked content 118. While it is not necessary for these two steps to be either physically or logically distinct, they are considered separately herein in order to facilitate understanding and for ease of explanation.

Composition

The primary functions of composition function 120 is to provide a set of selected tributaries 122, in accordance with the customization information 108, to be used for producing a particular instance of distinctly marked content 118, and to determine the rendering information 124 necessary to guide its production. The composition function 120 may also include the act of mark encoding, which maps the mark message 116 into an alternate sequence of symbols (the "mark sequence") that represent the mark message 116 as it is embodied within the distinctly marked content 118. An exemplary diagram of the relationship between the elements of the composition function is provided in FIG. 3.

Nexus Resolution

Figure 3:
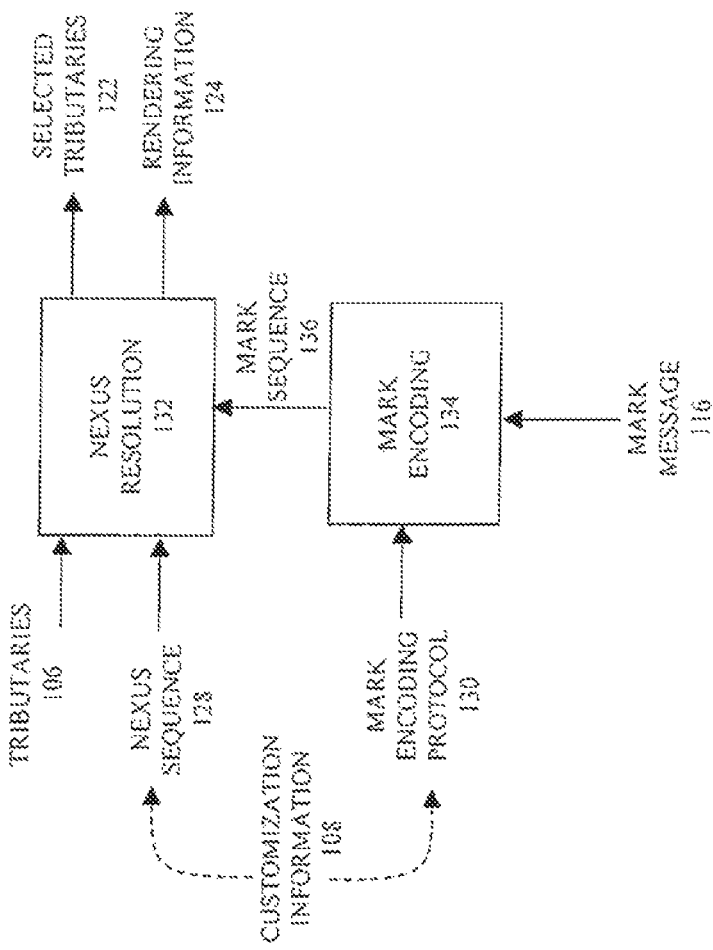
FIG. 3 illustrates various elements of the composition function of FIG. 2 in accordance with an example embodiment of the invention.
Figure 4:
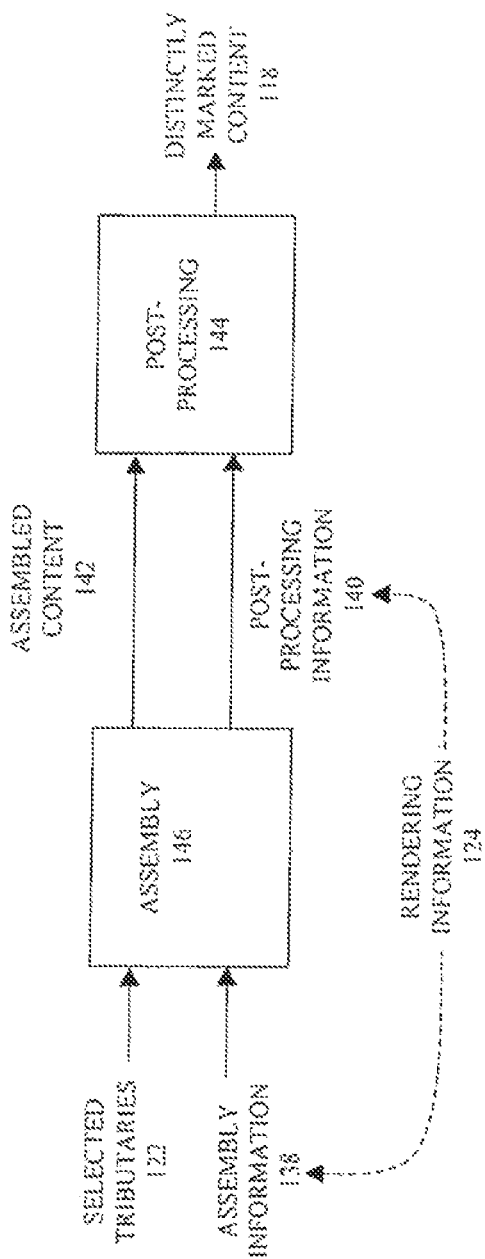
FIG. 4 illustrates various elements of the rendering function of FIG. 2 in accordance with an example embodiment of the invention.

As shown in FIG. 3, the essential operation involved in composition 120 is the selection process, which is referred to herein as nexus resolution 132. The term "nexus" is used in this context to mean the information associated with all of the potential selections among the various alternative versions of content that may be rendered to embody a symbol in a mark sequence 136. An exemplary nexus may comprise an association between each mark sequence 136 symbol value and instructions for rendering specific tributaries whenever those symbol values exist in the mark sequence 136. Nexus resolution 132, then, is the process whereby a particular nexus (or, more generally, a multiplicity of nexuses associated with elements of a mark sequence 136, which is referred to herein as a nexus sequence 128) is evaluated to provide the selected tributaries 122 and rendering information 124 necessary to forensically mark the content with the elements of a specific mark sequence 136. As shown in FIG. 4, the rendering information 124, for example, may comprise the information necessary to assemble the selected tributaries 122 (i.e., the assembly information 138), the information necessary for post processing the assembled content 142 (i.e., the post-processing information 140), and the like. The nexus sequence 128, which may be part of the customization information 108 produced by the pre-processing function 104, may be expressed explicitly, such as in an enumerated list within a data structure (i.e., a 'nexus list'), or implicitly, for example by specifying a pattern of nexuses according to an algorithmic or formulaic expression. Note that for practical purposes, it may be desirable to permit the specification of nexuses, which correspond to a tributary that is selected for rendering, independent of any mark sequence value and therefore common among all versions of the content (i.e. a "unary nexus").

Mark Encoding

Mark encoding 134 performs a mapping between a mark message 116, which is the information carried by the mark that is used to distinguish the marked copy of the content from other copies of distinctly marked content, and the mark sequence 136, which is the sequence of symbols that is actually incorporated into the content. The mark encoding function 134 may provide capabilities that support any of the myriad channel coding techniques known in the art of communication and watermark technology. By way of example and not by limitation, these include the incorporation of error correction codes and synchronization symbols, interleaving and encryption of the mark message 116, as well as mapping the mark message 116 into pre-defined mark sequences using look-up tables or mapping functions.

Because it is desirable that a common customization function 114 provide compatibility with a range of forensic marking schemes, it may be useful for the mark encoding function 134 to provide a range of common channel coding techniques that may be employed in any instance according to a particular mark encoding protocol, which may be specified via customization information 108. Additionally, it may be useful for the mark encoding function 134 to provide additional data communications message formation functions, such as encryption, hashing, or digital signature formation, as directed by mark encoding protocol 130. The mark encoding protocols 130 may be communicated to the mark encoding function 134 as part of the customization information 108 produced by the pre-processing function 104. In a simple exemplary embodiment, the mark encoding protocol 130 may be implemented as a look-up table that maps the incoming mark message 116 symbols into pre-defined mark sequences 136 in accordance with any combination of the above described channel coding and security protocols. This way, the need to incorporate any specific channel coding and/or security protocols within the mark encoding function 134 is eliminated. Furthermore, the look-up table may be readily updated to reflect new security, robustness or economic requirements of the marking system.

Rendering

An exemplary diagram of the relationship between the elements of the rendering function 126 of FIG. 2 is provided in FIG. 4. The rendering function 126 assembles the selected tributaries 122 in accordance with rendering information 124 provided by the composition function 120 to produce a distinctly marked content signal 118. In some embodiments, it may also be useful for the rendering function 126 to provide a capability of applying post-processing 144 to the assembled content 142 in accordance with the post-processing information 140 that is provided by the composition function 120. The post-processing function 144 may comprise a plurality of operations that serve to, for example, mask the presence of the embedded mark, change the content resolution, change the sampling rate, or otherwise modify the assembled content 142 to place it in a suitable output format as dictated by the post-processing information 140 or system interface requirements.

Assembly

The rendering function 126 provides support for one or more methods of producing assembled content 142 by assembly function 146 under the direction of the assembly information 138 provided as part of the rendering information 124. Examples of general methods of assembly that may be supported include splicing, replacement (with or without masking of various kinds), addition, multiplication, blending (e.g. linear combination), or combinations of methods such as these. In general, the assembly information 138 may express (and the assembly function 146 may support) the interpretation and execution of a range of typical content processing functions as might be found in existing systems that perform rendering of content from a collection of production elements in accordance with an expression of assembly information. Well-known content encoding formats of this type include Adobe Portable Document Format, Microsoft Word XML document schema, MXF, Advanced Authoring Format, Advanced Systems Format, Broadcast Wave Format, and Mobile XMF. Many of the techniques for expression and processing of rendering information expressions that are known in the art are considered to be useful in conjunction with the present invention.

Selection of the particular methods of assembly supported by a common customization function 114 will largely define the types of forensic marking schemes with which it will be compatible, so the methods selected should be chosen based on techniques that are expected to be useful in practical marking schemes. This selection will also dictate the operational burden placed on devices that implement the assembly function 146, so the range of assembly methods supported should be influenced by their value and generality.

Post-Processing

The rendering function 126 may optionally support the application of one or more post-processing functions 144 on the assembled content 142 in accordance with the post-processing information 140. While some post-processing operations may be utilized to further differentiate the distinctly marked content 118 from the original content 100, other operations may be used to enhance the security of the embedded marks, to enhance the transparency of the embedded marks, or to perform signal conditioning operations that facilitate subsequent storage, presentation or transmission of the marked content. By way of example and not by limitation, some post-processing operations include applying masking and anti-collusion measures, signal saturation/clipping prevention techniques, application of dither, application of special artistic/aesthetic effects, gamma correction, color correction, cryptographic operations, and the like.

Validation

The validation function 110 (FIG. 1) evaluates and analyzes the information output from the pre-processing function 104 in order to obtain validation information 112. The validation information 112 is predictive of what will occur when certain information (e.g., customization information) are provided to a common customization function 114. For example, as shown in FIG. 1, the validation function 110 may determine whether a given expression of tributaries 106 and customization information 108 contains any deviations from a specific protocol associated with a common customization function 114.

The validation function 110 may also measure certain aspects of an instance of tributaries 106 and customization information 108, such as the amount of processing, memory, or latency necessary for a common customization function 114 to evaluate those instances ('execution profiling'), given certain assumptions about the mark message 116. Validation functions may be employed at different parts of the content distribution chain. For example, it may be desirable to perform a validation function in conjunction with pre-processing in order to select from alternative possible expressions of tributaries and customization information based on measurable characteristics of their performance or to ensure their compatibility with the common customization functions supported by a specific class of devices. Additionally, they may be employed on a standalone basis by a content distributor who wants to ensure that content that they distribute is compatible with a common customization function performed by certain specific devices to which they distribute materials. Validation functions may also exist in any environments where common customization functions reside, and be employed prior to content customization in order to determine a priori the results of performing forensic mark customization.

Techniques that may be employed for performing validation functions, such as specification compliance verification and execution profiling, are generally well-known in the art.

Exemplary Embodiment

To illustrate the most basic elements of the present invention, as a first example a simple embodiment of the invention is described. This example embodiment is described with specific, limited detail for the purpose of providing clear and concrete examples of the concepts, but is not intended in any way to limit or fix the scope of the present invention. Nevertheless, this simple example has substantial flexibility and is, as is demonstrated below, compatible with many of the forensic marking schemes known in the art.

Exemplary Common Customization Function

In this embodiment, a common customization function 114 may be defined specifically for use with schemes for the forensic marking of audio content with a 40-bit mark message 116. The common customization function 114 (including all component functions described herein) may be embodied in a stored program on a hard-disk in a computer system located in the projection booth of a commercial movie theater. The computer system may be one among many connected to a wide-area network over which digital audio and video are distributed to multiple similar computer systems in multiple similar projection booths in multiple movie theaters. An additional function of the computer system is to access content at the time when a movie is to be shown in the theater, process it with the common customization function 114 in order to obtain a distinctly marked content 118, and output the distinctly marked content 118 sequentially for playback to the movie theater audience. Each such computer system may have a stored unique serial number and an internal clock, from which the common customization function 114 may derive a 40-bit mark message 116 to be forensically marked into the audio of each movie presentation output from the computer system.

The implementation of the present invention in this particular environment enables the manufacturer of the computer system to only incorporate a single common customization function 114 to provide a playback environment that is compatible with a range of forensic marking schemes. In addition, any one of a variety of forensic marking schemes may be used for a particular movie content at the discretion of the movie producer or distributor, and such schemes will be compatible with any device that employs the common customization function 114, regardless of any other playback device characteristics.

In an exemplary movie screening scenario, prior to playback, pre-processed audio content may be securely delivered from another computer system at a movie distributor to the computer system in the projection booth over the wide area network in the form of a computer file that contains both tributaries 106 and customization information 108. (The associated video content is provided as well, and may also be pre-processed for handling by a common customization function 114, but for simplicity of exposition in this example, only the audio portion of the content is considered.) Such an audio file may be compliant with, for example, the Broadcast Wave format. Two types of data chunks exist within the file that contain the customization information 108, the nexus sequence 128 and mark encoding protocol 130, respectively, which may be provided in big-endian format. Tributaries 106 may be stored in audio chunks, with one tributary per audio chunk. Tributaries 106 may be encoded as eight channel PCM audio at a 48 kHz sampling rate. The exemplary nexus sequence and post-processing grammar may be defined as shown in Table 1 and the exemplary mark encoding protocol grammar may be shown as defined in Table 2 below, using a data format conforming to the Extended Backus-Naur form grammars.

TABLE 1

EXEMPLARY NEXUS SEQUENCE AND POST PROCESSING GRAMMAR

| | |
|---|---|
| 1 | nexus-list = post-processing-information* nexus |
| 2 | (nexus | post-processing-information)* nexus-list-end-instruction |
| 3 | nexus := single-nexus | repeating-nexus |
| 4 | single-nexus := '0x01', nexus-element |
| 5 | repeating-nexus := '0x02', repetition-count nexus-element |
| 6 | repetition-count := "32-bit unsigned integer" |
| 7 | nexus-element := unary-nexus | binary-nexus |
| 8 | nexus-list-end-instruction := end-nexus-list | repeat-nexus-list |
| 9 | end-nexus-list = '0x00' |
| 10 | repeat-nexus-list = '0x01' absolute-marker |
| 11 | unary-nexus := '0x00' tributary-index assembly-information |
| 12 | binary-nexus := |
| 13 | '0x01' zero-value-output one-value-output |
| 14 | zero-value-output := assembly-information |
| 15 | one-value-output := assembly-information |
| 16 | tributary-index := "16-bit unsigned integer" |
| 17 | assembly-information := |

TABLE 1-continued

EXEMPLARY NEXUS SEQUENCE AND POST PROCESSING GRAMMAR

| | |
|---|---|
| 18 | tributary-index |
| 19 | tributary-start-marker tributary-duration |
| 20 | fade-information fade-information |
| 21 | render-start-marker |
| 22 | assembly-type |
| 23 | tributary-start-marker := absolute-marker | register-marker |
| 24 | tributary-duration := absolute-marker |
| 25 | render-start-marker := absolute-marker | register-marker |
| 26 | absolute-marker := '0x00' "32-bit unsigned integer" |
| 27 | register-marker:= '0x01' register-mod-type register-mod-amount |
| 28 | register-mod-type := offset | offset-update | offset-clear | |
| 29 |    random-offset | random-offset-update | random-clear |
| 30 | register-mod-amount := "32-bit signed integer" |
| 31 | offset := '0x00' |
| 32 | offset-update := '0x01' |
| 33 | offset-clear := '0x02' |
| 34 | random-offset := '0x03' |
| 35 | random-offset-update := '0x04' |
| 36 | random-offset-clear := '0x05' |
| 37 | assembly-type := replace | add |
| 38 | replace := '0x00' |
| 39 | add := '0x01' |
| 40 | fade-information := no-fade | linear-fade |
| 41 | no-fade := '0x00' |
| 42 | linear-fade := '0x01' fade-duration |
| 43 | fade-duration := absolute-marker |
| 44 | post-processing-info := '0x03' limiting-type |
| 45 | limiting-type := hard-clipping | soft-clipping |
| 46 | hard-clipping := '0x00' |
| 47 | soft-clipping := '0x01' |

TABLE 2

EXEMPLARY MARK ENCODING PROTOCOL GRAMMAR

| | |
|---|---|
| 1 | mark-encoding-protocol := mark-encoding" |
| 2 | mark-encoding := constant-bit | mark-message-bit | xor-mark-message-bit | mapping |
| 3 | constant-bit := '0x00' binary-value |
| 4 | mark-message-bit := '0x01' |
| 5 | xor-mark-message-bit := '0x02' binary-value |
| 6 | mapping := '0x03' input-count output-count mapping-table |
| 7 | binary-value := '0x00' | '0x01' |
| 8 | mapping-table := |
| 9 | "row-first matrix of binary values with 2^(input-count) rows and |
| 10 | (output-count) columns" |

For this example, it is assumed that the computer server does not impose tight constraints on the processing, memory, and latency of the customization function. It should be recognized, however, that such constraints will exist in many practical cases. There would be no guarantee that all content expressible in this format would meet a particular set of constraints, and careful design of the particular expression of content (in addition to the use of a validation function for measurement of these parameters) might be needed for different classes of devices with common customization functions.

Exemplary Nexus Resolution

In the exemplary embodiment shown in Table 1 above, the nexus resolution function 132 is carried out by sequentially processing the nexuses in the nexus sequence 128 in accordance with the specified grammar of Table 1. Each nexus may be expressed either as a "single nexus" which is evaluated one time, or as a "repeating nexus" which is repeatedly evaluated a specified number of times in succession. In the processing of unary nexuses, an associated tributary index (which identifies the candidate tributaries) is selected. Assembly information 138 is provided as output of the composition function 120 for rendering. In the processing of binary nexuses, a mark sequence value is received from the mark encoding function 134, and used to select one of two tributary index and assembly information 138 pairs in the nexus for output. Post-processing information 140, when present, is provided in the same data stream as the nexus sequence 128 and is time-multiplexed. Post-processing information 140 is output directly to the post-processing function 144 without modification. Assembly information 138 is provided to the assembly function 146, along with the associated tributary index value obtained from each nexus. When all nexuses from the nexus sequence 128 have been evaluated, the nexus resolution function 132 is either completed or it repeats from the start of the nexus list (in which case a counter is supplied for the total number of nexuses to be processed prior to completion of nexus resolution) according to information provided at the end of the nexus list.

Exemplary Mark Encoding

The mark encoding function 134 is carried out by sequentially processing the elements of the mark encoding protocol 130 in accordance with the grammar that is shown in Table 2 above. Processing consists of retrieving, processing, and outputting mark sequence values, in accordance with the specified mark encoding protocol 130. The "constant bit" expression in Table 2 indicates the output of a fixed mark sequence bit value, independent of the values of the mark message 116. The "mark message bit" expression indicates the output of a mark sequence bit that is equal to the corresponding bit value in the mark message 116. The "XOR mark message bit" expression indicates the output of a mark sequence bit value that results from a logical XOR between a value provided by the mark encoding protocol 130 and a value taken from the mark message 116. The "mapping" expression indicates the output of a sequence of mark sequence bit values taken from a table stored in the mark encoding protocol 130. The table is stored in the form of a table of output sequences (in rows), with the row that is output from the table selected by the value of the binary word expressed by a sequence of bits taken from the mark message 116. For example, if the input count is 3 and the output count is 4, then a table of output values that is 8 ($2^3$) rows by 4 columns is provided. Three bits from the mark message 116 are read, and their binary value (0-7) is used to select a row from the table. The mark sequence output 136 generated by the mark encoding function 134 is then the set of values stored in that row of the table.

When all elements of the mark encoding protocol 130 have been processed, the mark encoding function 134 returns to the beginning of the mark encoding protocol 130 and continues its processing as if the mark encoding protocol 130 were repeated serially. Similarly, if the mark encoding function 134 reaches the end of the mark message 116, its operations continue from the start of the mark message 116, as if values were repeated serially. The mark encoding function 134 continues to operate in this way, so long as the nexus resolution function 132 continues to require additional mark sequence values 136.

Exemplary Assembly Function

The assembly function 146 is carried out by sequentially processing the output of the nexus resolution function 132, which consists of a sequence of tributary index/assembly information element pairs. Table 1 above provides examples of such assembly information 138 that include multiple fields. Markers specify indices of the start and duration of the tributaries that are selected for composition ("tributary segment"), which may be computed from a stored tributary marker register, and an expression may also indicate modification of the register in one of several ways following its use. A fading characteristic may be specified for application to the start and end of the tributary segment (i.e. a gradual amplitude fade with a specified duration and curve shape for each endpoint of the tributary segment) prior to composition. Expressions are provided for determining an index for the starting point in the output stream where the tributary segment should be placed based on a stored output marker register, and an expression may also direct modification of the register in one of several ways following its use. An additional information field is provided that specifies how the tributary segment should be composed with other segments that may overlap in time in the assembled content (i.e. whether the data from the earlier segment in the sequence should be replaced by the latter or whether the two segments should be added together). Processing of the assembly information 138 consists of performing the retrieval, alignment, and composition of the selected tributary segments 122 to form assembled content 142 in accordance with the assembly information expressions.

Exemplary Post-Processing

The post-processing function 144 is carried out by sequentially processing the elements of post-processing information 140 as described in the exemplary grammar listing of Table 1, lines 44 through 47. Parsing consists of lexical analysis of the data in the post-processing information 140 in accordance with the nexus sequence grammar defined in the listing of Table 1. Evaluation consists of applying a function to the assembled content 142 in accordance with settings dictated by the post-processing information 140. In the case of hard clipping, the assembled content 142 is evaluated to determine whether any of the values of the content samples have exceeded the dynamic range supported by the output device. Any samples that have exceeded that dynamic range are set to the nearest value that is within the dynamic range of the output device.

In the case of soft clipping, the entirety of the assembled content 142 is processed through the non-linear function, such as the one specified by:

$$y = \begin{cases} x(1 - 0.08192\, x^4), & \text{for } |x| < 1.25 \\ \text{sign}(x) & \text{for } |x| \geq 1.25, \end{cases} \quad \text{Equation (1)}$$

where x is the value of the assembled content, y is the value of the soft-limited content, and [−1,1] is the normalized range of the output device.

Exemplary Forensic Marking Schemes Using Exemplary Embodiment

To illustrate certain benefits of the exemplary embodiment, its use in conjunction with a forensic marking scheme previously known in the art is described.

Exemplary Forensic Marking Scheme

In the first embodiment described in the U.S. Pat. No. 6,612,315 an arrangement is employed whereby original audio content is pre-processed to generate two alternate versions, each embedded with a synchronous stream of watermark data. The first version is embedded with a watermark sequence comprised entirely of a first logical value, such as the binary value "0" and the second version is embedded with a watermark sequence comprised entirely of a second logical value, such as the binary value "1." A customization method is employed whereby distinct content carrying a watermark data stream with an arbitrary mark sequence is produced by splicing sequential segments selected from one of the two alternate versions in accordance with the values of a mark sequence. To avoid introducing discontinuities through the splicing function, selected segments are taken with a short, overlapping transition regions and the segments are blended via cross-fade. For purposes of this example, it is assumes that the bits are embedded in audio segments that are 5.33 ms in duration (256 samples at 48 kHz sampling rate) and that the cross-fade region is 0.33 ms in duration (16 samples at 48 kHz). It is also assumed, for purposes of this example, that the mark encoding protocol simply prepends the frame synchronization sequence '0111' to the mark message to form the mark sequence, and repeatedly transmits this sequence throughout the duration of the content.

Adaptation of the pre-processing step associated with the scheme described above to one that generates tributaries and customization information compatible with the common customization function 114 described in the exemplary embodiment of the present invention is straightforward. The original content is pre-processed to obtain the versions embedded with logical values (e.g., "0" and "1" watermark data sequences, respectively) at pre-processing function 104 and the two versions are stored in two tributaries ("tributary 0" and "tributary 1"). A nexus list is produced as shown in Table 3 below.

TABLE 3

EXAMPLE NEXUS LIST

| 1 | ; Post processing info | | |
|---|---|---|---|
| 2 | 03 00 | ; | Use hard clipping |
| 3 | ; First nexus, only used for first element | | |
| 4 | 01 01 | ; | Single, binary nexus |
| 5 | 00 00 | ; | Zero-value output, use tributary 0 |
| 6 | 01 01 | ; | For tributary start, use register with offset update |
| 7 | 00 00 00 F0 | ; | to 256−16=240, leaving marker at start of next fadein |
| 8 | 00 00 01 10 | ; | Tributary duration is 256+16 (bit plus fadeout) |
| 9 | 00 | ; | No fade in |
| 10 | 01 00 00 00 10 | ; | Use 16 sample linear fadeout |
| 11 | 01 01 | ; | For render start, use register with offset update |
| 12 | 00 00 00 F0 | ; | to 256−16=240, leaving marker at start of next fadein |
| 13 | 00 | ; | Assemble by replacement |
| 14 | 00 01 | ; | One-value output, use tributary 1 |
| 15 | 01 01 | ; | For tributary start, use register with offset update |
| 16 | 00 00 00 F0 | ; | to 256−16=240, leaving marker at start of next fadein |
| 17 | 00 00 01 00 | ; | Tributary duration is 256+16 (bit plus fadeout) |
| 18 | 00 | ; | No fade in |
| 19 | 01 00 00 00 10 | ; | Use 16 sample linear fadeout |
| 20 | 01 01 | ; | For render start, use register with offset update |
| 21 | 00 00 00 F0 | ; | to 256−16=240, leaving marker at start of next fadein |

TABLE 3-continued

EXAMPLE NEXUS LIST

| | | | |
|---|---|---|---|
| 22 | 00 | ; | Assemble by replacement |
| 23 | ; Repeated nexus for elements 2-674,999 | | |
| 24 | 02 00 0A 4C B6 01 | ; | Binary nexus, repeated 674,998 times (2 hours total) |
| 25 | 00 00 | ; | Zero-value output, use tributary 0 |
| 26 | 01 01 | ; | For tributary start, use input register with update |
| 27 | 00 00 01 00 | ; | by 256, leaving marker at start of next bit's fadein |
| 28 | 00 00 01 20 | ; | Tributary duration is 16+256+16 (fadein+bit+fadeout) |
| 29 | 01 00 00 00 10 | ; | Use 16 sample linear fadein |
| 30 | 01 00 00 00 10 | ; | Use 16 sample linear fadeout |
| 31 | 01 01 | ; | For render start, use output register with offset update |
| 32 | 00 00 01 00 | ; | by 256, leaving marker at start of next bit's fadein |
| 33 | 01 | ; | Assemble by addition |
| 34 | 00 01 | ; | One-value output, use tributary 1 |
| 35 | 01 01 | ; | For tributary start, use register with offset update |
| 36 | 00 00 01 00 | ; | by 256, leaving marker at start of next bit's fadein |
| 37 | 00 00 01 20 | ; | Tributary duration is 16+256+16 (fadein+bit+fadeout) |
| 39 | 01 00 00 00 10 | ; | Use 16 sample linear fadein |
| 40 | 01 00 00 00 10 | ; | Use 16 sample linear fadeout |
| 41 | 01 01 | ; | For render start, use register with offset update |
| 42 | 00 00 01 00 | ; | to 256, leaving marker at start of next bit's fadein |
| 43 | 01 | ; | Assemble by addition |
| 44 | ; Single nexus used for last element only | | |
| 45 | 01 01 | ; | Single, binary nexus |
| 46 | 00 00 | ; | Zero-value output, use tributary 0 |
| 47 | 01 00 00 00 00 00 | ; | For tributary start, use input register with no offset |
| 48 | 00 00 01 10 | ; | Tributary duration is 16+256 (fadein+bit) |
| 49 | 01 00 00 00 10 | ; | Use 16 sample linear fadein |
| 50 | 00 | ; | No fadeout |
| 51 | 01 00 | ; | For render start, use output register with no offset |
| 52 | 00 00 00 00 ; | | |
| 53 | 01 | ; | Assemble by addition |
| 54 | 00 01 | ; | One-value output, use tributary 1 |
| 55 | 01 00 00 00 00 00 | ; | For tributary start, use register with no offset |
| 56 | 00 00 01 10 | ; | Tributary length is 16+256 (fadein+bit) |
| 57 | 01 00 00 00 10 | ; | Use 16 sample linear fadein |
| 58 | 00 | ; | No fadeout |
| 59 | 01 00 | ; | For render start, use register with no offset |
| 60 | 00 00 00 00 | ; | to 256, leaving marker at start of next fadein |
| 61 | 01 | ; | Assemble by addition |
| 62 | ; End nexus list | | |
| 63 | 00 | | |

This nexus list shown in Table 3 comprises instructions for the first and last elements of the mark sequence 136 that are different from the instructions for the remaining elements of the sequence. A mark encoding protocol 130 is produced as shown in Table 4 below.

TABLE 4

EXAMPLE MARK ENCODING PROTOCOL

| | |
|---|---|
| 1 ; | Output fixed synchronization sequence '1011' |
| 2 | 00 01 |
| 3 | 00 00 |
| 4 | 00 01 |
| 5 | 00 01 |
| 6 ; | Output 40 mark message bits |
| 7 | 01 01 01 01 01 01 01 01 01 01 01 01 01 01 01 01 01 01 01 01 |
| 8 | 01 01 01 01 01 01 01 01 01 01 01 01 01 01 01 01 01 01 01 01 |

The original content in this case is presumed to be two hours (675,000 bits of 5.3 ms each).

Although his particular arrangement complies with the data format requirement of the exemplary embodiment and would be compatible with the described device, it should be appreciated that many different adaptations of the present invention may be made without departing from the scope of the invention. For example, it is noted that the tributaries described in this exemplary embodiment are large and the distance between alternate tributary segments employed in individual nexuses may introduce a significant memory usage requirement or alternately a random data access requirement on the common customization function. This approach may not be suitable for all devices that support the common customization, such as those with limited memory or only serial access to data. For such cases, an alternate expression might entail dividing each of the two versions of the content into many tributaries, each containing only a short segment of the content marked with "0" or "1" data symbols, and interleaving these shorter tributaries so that there is a greater locality of reference within the data stream. The nexus sequence and post-processing data might also be interleaved with the tributary data to achieve a similar advantage. By establishing requirements for processing utilization over time, memory, storage and data access, processing latency, etc., it becomes possible to design devices that implement a common customization function with a well-defined capability, and to design pre-processing and validation methodologies that enable the production of tributaries and customization information that can be reliably employed in conjunction with them to obtain forensically marked content in a range of practical environments.

It should now be appreciated that the present invention provides advantageous methods, systems and apparatus for forensic watermarking using a common customization function.

Although the invention has been described in connection with various illustrated embodiments, numerous modifications and adaptations may be made thereto without departing from the spirit and scope of the invention as set forth in the claims.

What is claimed is:

1. A method for producing a marked content, comprising:
receiving customization information and a plurality of tributaries, the plurality of tributaries having been produced by pre-processing an original content or content element; and
processing two or more of the received tributaries in accordance with the customization information using a common customization function to produce a marked content, wherein
the customization information and the plurality of the tributaries are sufficient for producing the marked content with any of a multiplicity of mark messages, without a further need for utilizing said original content, and
the customization information comprises instructions to the common customization function as to how the received tributaries should be combined to produce a marked content that comprises one or more of the mark messages.

2. The method of claim 1, wherein the common customization function is responsive to instructions provided by the customization information to enable the production of the marked content in accordance with a plurality of different marking techniques.

3. The method of claim 1, wherein the customization information specifies a mark encoding protocol.

4. The method of claim 3, wherein the mark encoding protocol includes one or more message formation protocols.

5. The method of claim 4, wherein the one or more message formation protocols include one or more of the following: an encryption protocol, a digital signature protocol, a hashing protocol, a channel coding protocol or an error correction code protocol.

6. The method of claim 3, wherein the mark encoding protocol provides a mapping of each mark message into predefined mark sequences.

7. The method of claim 6, wherein the mark encoding protocol uses a look-up table for the mapping.

8. The method of claim 1, wherein at least one of the received tributaries comprises instructions for generating an alternate version of the original content or content element.

9. The method of claim 1, wherein the marked content is a representation of the original content in which one or more segments of the original content is replaced with one or more alternate segments.

10. A device, comprising:
a receiver implemented at least partly in hardware and configured to receive customization information and a plurality of tributaries, the plurality of tributaries and customization information having been produced by preprocessing an original content or content element; and
a common customization component implemented at least partly in hardware and configured to process two or more of the received tributaries in accordance with the customization information to produce a marked content, wherein:
the customization information and the plurality of the tributaries are sufficient for producing the marked content with any of a multiplicity of mark messages, without a further need for utilizing said original content, and
the customization information comprises instructions to the common customization component as to how the received tributaries should be combined to produce a marked content that comprises one or more of the mark messages.

11. The device of claim 10, wherein the common customization component is responsive to instructions provided by the customization information to enable the production of the marked content in accordance with a plurality of different marking techniques.

12. The device of claim 10, wherein the customization information specifies a mark encoding protocol.

13. The device of claim 12, wherein the mark encoding protocol includes one or more message formation protocols.

14. The device of claim 13, wherein the one or more message formation protocols include one or more of the following: an encryption protocol, a digital signature protocol, a hashing protocol, a channel coding protocol or an error correction code protocol.

15. The device of claim 12, wherein the mark encoding protocol provides a mapping of each mark message into predefined mark sequences.

16. The device of claim 15, wherein the mark encoding protocol uses a took-up table for the mapping.

17. The device of claim 10, wherein at least one of the received tributaries comprises instructions for generating an alternate version of the original content or content element.

18. The device of claim 10, wherein the marked content is a representation of die original content in which one or more segments of the original content is replaced with one or more alternate segments.

19. A device, comprising:
a processor, and
a memory comprising processor executable code, the processor executable code, when executed by the processor, configuring the device to:
receive customization information and a plurality of tributaries, the plurality of tributaries having been produced by pre-processing an original content or content element; and
process two or more of the received tributaries in accordance with the customization information using a common customization function to produce a marked content, wherein
the customization information and the plurality of the tributaries are sufficient for producing the marked content with any of a multiplicity of mark messages, without a further need for utilizing said original content, and
the customization information comprises instructions to the common customization function as to how the received tributaries should be combined to produce a marked content that comprises one or more of the mark messages.

20. A computer program product, embodied on a non-transitory computer readable medium, comprising:
program code for receiving customization information and a plurality of tributaries, the plurality of tributaries having been produced by pre-processing an original content or content element; and
program code for processing two or more of the received tributaries in accordance with the customization information using a common customization function to produce a marked content, wherein
the customization information and the plurality of the tributaries are sufficient for producing the marked content with any of a multiplicity of mark messages, without a further need for utilizing said original content, and
the customization information comprises instructions to the common customization function as to how the received tributaries should be combined to produce a marked content that comprises one or more of the mark messages.

* * * * *